US009195124B2

(12) United States Patent
Johnston et al.

(10) Patent No.: US 9,195,124 B2
(45) Date of Patent: Nov. 24, 2015

(54) AUTOMATIC PROJECTOR SAFETY PROTOCOLS

(71) Applicant: Plantronics, Inc., Santa Cruz, CA (US)

(72) Inventors: Timothy P Johnston, Los Gatos, CA (US); William J Loewenthal, Jr., San Mateo, CA (US)

(73) Assignee: Plantronics, Inc., Santa Cruz, CA (US)

( * ) Notice: Subject to any disclaimer, the term of this patent is extended or adjusted under 35 U.S.C. 154(b) by 47 days.

(21) Appl. No.: 14/136,206

(22) Filed: Dec. 20, 2013

(65) Prior Publication Data

US 2015/0177604 A1 Jun. 25, 2015

(51) Int. Cl.
| *H04B 17/00* | (2015.01) |
| *G03B 21/20* | (2006.01) |
| *H04M 1/05* | (2006.01) |
| *H04M 1/02* | (2006.01) |

(52) U.S. Cl.
CPC .............. *G03B 21/2053* (2013.01); *H04M 1/05* (2013.01); *H04M 1/0272* (2013.01); *H04M 2250/54* (2013.01)

(58) Field of Classification Search
CPC ................... H01L 2224/73265; H01L 33/648; G02B 2027/0178; G02B 27/017; G02B 27/014; G02B 27/0093; G02B 2027/0187; G02B 2027/0132; G02B 27/0149; G02B 2027/0138; G02B 5/30; G02B 6/12009; G02B 6/12019
USPC ........ 455/566; 353/85, 101, 79, 122, 98, 121, 353/52; 434/379, 365; 359/459, 1, 443, 359/631; 345/419, 633, 156, 84, 107, 175, 345/3.1, 714, 1.1; 348/51, 744, 14.01
See application file for complete search history.

(56) References Cited

U.S. PATENT DOCUMENTS

| 5,306,902 | A * | 4/1994 | Goodman ................... 250/201.3 |
| 5,478,241 | A * | 12/1995 | Hsu ............................... 434/379 |
| 5,658,062 | A * | 8/1997 | Lee et al. ....................... 353/85 |
| 6,460,999 | B1 * | 10/2002 | Suzuki ............................ 353/79 |
| 8,430,310 | B1 * | 4/2013 | Ho et al. ........................ 235/382 |
| 2003/0184575 | A1 * | 10/2003 | Reho et al. .................... 345/714 |
| 2007/0052638 | A1 * | 3/2007 | May et al. ....................... 345/84 |
| 2007/0091432 | A1 * | 4/2007 | Garner et al. ................. 359/459 |
| 2007/0091433 | A1 * | 4/2007 | Garner et al. ................. 359/459 |
| 2007/0091434 | A1 * | 4/2007 | Garner et al. ................. 359/459 |
| 2007/0091435 | A1 * | 4/2007 | Garner et al. ................. 359/459 |
| 2007/0229650 | A1 * | 10/2007 | McKay ...................... 348/14.01 |
| 2008/0080047 | A1 * | 4/2008 | Field et al. .................... 359/443 |
| 2009/0046140 | A1 * | 2/2009 | Lashmet et al. ................. 348/51 |
| 2010/0045569 | A1 * | 2/2010 | Estevez et al. ................ 345/3.1 |
| 2010/0142014 | A1 * | 6/2010 | Rosen et al. ...................... 359/1 |
| 2010/0204841 | A1 * | 8/2010 | Chemel et al. ................ 700/282 |
| 2012/0120375 | A1 * | 5/2012 | Kilcher et al. ................... 353/98 |
| 2013/0016070 | A1 * | 1/2013 | Starner et al. ................. 345/175 |
| 2013/0083003 | A1 * | 4/2013 | Perez et al. .................... 345/419 |
| 2013/0106692 | A1 * | 5/2013 | Maizels et al. ................ 345/156 |
| 2013/0107021 | A1 * | 5/2013 | Maizels et al. .................. 348/50 |
| 2013/0114043 | A1 * | 5/2013 | Balan et al. ................... 351/210 |
| 2013/0127980 | A1 * | 5/2013 | Haddick et al. ............ 348/14.08 |

(Continued)

*Primary Examiner* — Tan H Trinh
(74) *Attorney, Agent, or Firm* — Richard A. Dunning, Jr.

(57) ABSTRACT

A projector having corresponding methods and computer-readable media comprises a detector configured to detect electromagnetic radiation; and a processor configured to implement a protocol responsive to the detector detecting the electromagnetic radiation, wherein the protocol comprises reducing an intensity of light projected by the projector.

15 Claims, 8 Drawing Sheets

(56) References Cited

U.S. PATENT DOCUMENTS

| | | | |
|---|---|---|---|
| 2013/0128233 A1* | 5/2013 | Sato | 353/52 |
| 2013/0229396 A1* | 9/2013 | Huebner | 345/207 |
| 2014/0333750 A1* | 11/2014 | Zhuang et al. | 348/79 |
| 2014/0341460 A1* | 11/2014 | Ballabio et al. | 382/141 |
| 2015/0002808 A1* | 1/2015 | Rizzo et al. | 351/158 |

* cited by examiner

AUTOMATIC PROJECTOR SAFETY PROTOCOLS

FIELD

The present disclosure relates generally to the field of the projection of light. More particularly, the present disclosure relates to modifying the projection when reflections of the light occur.

BACKGROUND

Projectors have long been used as a way of displaying images upon various surfaces by projecting light representing the images. However, the use of projectors raises safety concerns when a person's eyes may be exposed to the projected light, which can be startling or dangerously bright. One safety concern arises when a projector is aimed at a surface that is too reflective, thereby reflecting the light into the eyes of people viewing the projection. Another safety concern arises when a person enters the field of projection and looks toward the projector.

SUMMARY

In general, in one aspect, an embodiment features a projector comprising: a detector configured to detect electromagnetic radiation; and a processor configured to implement a protocol responsive to the detector detecting the electromagnetic radiation, wherein the protocol comprises reducing an intensity of light projected by the projector.

Embodiments of the projector can include one or more of the following features. Some embodiments comprise an alert module configured to manifest an alert indication responsive to the detector detecting the electromagnetic radiation. In some embodiments, the processor implements the protocol only responsive to the light and the electromagnetic radiation having substantially the same wavelength. In some embodiments, the processor is further configured to determine whether the electromagnetic radiation represents a reflection of the light by a human face; and the projector implements the protocol only responsive to the processor determining that the electromagnetic radiation represents a reflection of the light by a human face. In some embodiments, wherein the electromagnetic radiation is first electromagnetic radiation, the projector further comprises: an emitter configured to emit second electromagnetic radiation; wherein the processor implements the protocol only responsive to the first electromagnetic radiation and the second electromagnetic radiation having substantially the same wavelength. Some embodiments comprise an attachment device configured to secure the projector to a user's head such that a field of view of the user coincides with a field of projection of the projector. Some embodiments comprise a phone. In some embodiments, the phone is configured to receive a call; and the processor is further configured to cause the projector to project an image that represents metadata for the call responsive to the phone receiving the call.

In general, in one aspect, an embodiment features a method comprising: projecting light; detecting electromagnetic radiation; and implementing a protocol responsive to detecting the electromagnetic radiation, wherein the protocol comprises reducing an intensity of the light.

Embodiments of the method can include one or more of the following features. Some embodiments comprise manifesting an alert indication responsive to detecting the electromagnetic radiation. Some embodiments comprise implementing the protocol only responsive to the light and the electromagnetic radiation having substantially the same wavelength. Some embodiments comprise determining whether the electromagnetic radiation represents a reflection of the light by a human face; and implementing the protocol only responsive to determining that the electromagnetic radiation represents a reflection of the light by a human face. In some embodiments, wherein the electromagnetic radiation is first electromagnetic radiation, and wherein the method further comprises: emitting second electromagnetic radiation; and implementing the protocol only responsive to the first electromagnetic radiation and the second electromagnetic radiation having substantially the same wavelength. Some embodiments comprise securing the projector to a user's head such that a field of view of the user coincides with a field of projection of the projector. Some embodiments comprise receiving a call; wherein the light creates an image that represents metadata for the call. Some embodiments comprise projecting the light responsive to receiving the call.

In general, in one aspect, an embodiment features computer-readable media embodying instructions executable by a computer to perform functions comprising: causing a projector to project light; and implementing a protocol responsive to detecting a reflection of the light, wherein the protocol comprises reducing an intensity of the light.

Embodiments of the computer-readable media can include one or more of the following features. In some embodiments, the functions further comprise: causing manifestation of an alert indication responsive to detecting the reflection. In some embodiments, the functions further comprise: determining whether the reflection is a reflection of the light by a human face; and implementing the protocol only responsive to determining the reflection is a reflection of the light by a human face.

The details of one or more implementations are set forth in the accompanying drawings and the description below. Other features will be apparent from the description and drawings, and from the claims.

DETAILED DESCRIPTION

Embodiments of the present disclosure provide automatic safety protocols for projectors of light. These safety protocols can include ceasing to project the light, reducing an intensity of the light, changing a direction of projection of the light, manifesting an alert indication, and the like. In some embodiments, the projector implements the safety protocols responsive to detecting light or other electromagnetic radiation. In some embodiments, the projector implements the safety protocols only when the light has substantially the same wavelength as the projected light. In some embodiments, the projector implements the safety protocols responsive to detecting a human face in the field of projection. In some embodiments, reflections are detected using out-of-band electromagnetic radiation instead of the projected light. In some embodiments, the projector is a standalone unit, such as can be mounted on a ceiling or placed on a table. In some embodiments, the projector may be hand-held, for example such as a micro projector or the like. In some embodiments, the projector is a wearable unit, for example a headset or the like. In the present disclosure, the projectors described are wearable. However, it will be understood that the present disclosure is applicable to other sorts of projectors as well. As used herein, the term "projector" includes devices that project light to display images, devices that project light to record images, or devices that do both.

Figure 1:
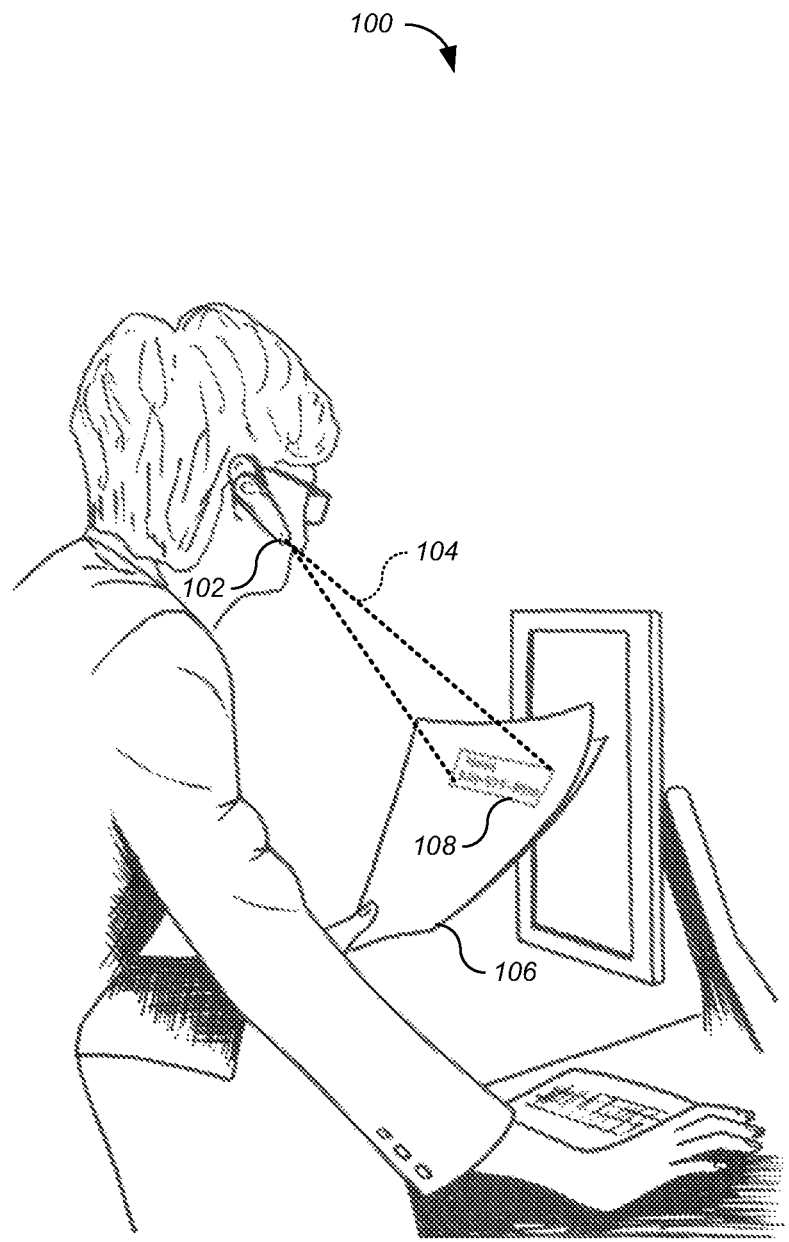
FIG. 1 illustrates a system for a wearable projector according to one embodiment.

FIG. 1 illustrates a system 100 for a wearable projector 102 according to one embodiment. The projector 102 is wearable thanks to an attachment device configured to secure the projector to a user's head such that a field of view of the user coincides with a field of projection of the projector 102. Referring to FIG. 1, the wearable projector 102 projects light 104 upon a surface 106, thereby allowing an image 108 to be seen by a user. In this example, the surface is a piece of paper. However, any suitable surface 106 may be used. The light 104 represents the image 108. In this example, the wearable projector is part of a headset for audio communication, and the image 108 represents metadata for an audio communication. In particular, the image 108 includes the name and telephone number of a caller. The projector may project the image 108 responsive to the headset receiving a call. Such headsets are described in U.S. Pat. Nos. 8,520,836 and 7,839,881, the disclosures thereof incorporated by reference herein in their entirety.

The projected image 108 may be of any type. The image 108 can represent call metadata, for example, a telephone number, a name, an icon, or the like. The image 108 can represent data related to headset functions, for example, headset settings, battery life, reception strength, telephone book entries, and the like. The image 108 can represent metadata for media, for example MP3 song titles, full motion video, time, date, and the like. The surface 106 can be any surface exterior to the headset, including but not limited to the user's hand, a piece of paper, a desktop, a wall, and the like.

The projector 102 may be wired or wireless. In one example, the projector 102 may be wired to an adaptor which is coupled to one or more networks. In another example, the projector 102 may be wirelessly coupled to one or more networks. The wireless communication protocols may include wireless fidelity (WiFi), Bluetooth, Digital Enhanced Cordless Telecommunications (DECT), and the like. The networks may include personal area networks (PAN), local area networks (LAN), wireless local area networks (WLAN), public switched telephone networks (PSTN), integrated services digital networks (ISDN), and the like.

Figure 2:
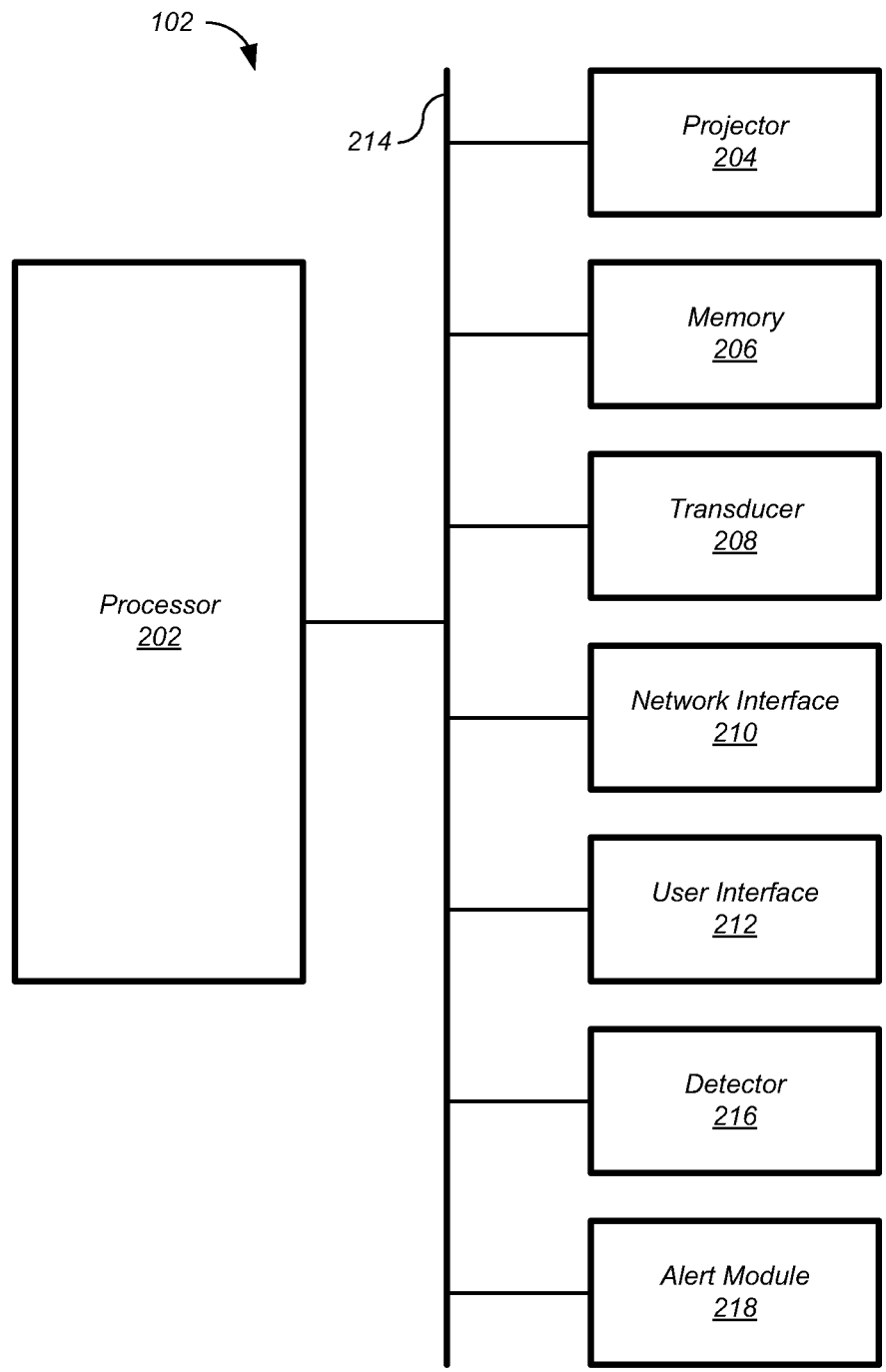
FIG. 2 shows elements of the wearable projector of FIG. 1 according to one embodiment.

FIG. 2 shows elements of the wearable projector 102 of FIG. 1 according to one embodiment. Although in the described embodiment elements of the wearable projector 102 are presented in one arrangement, other embodiments may feature other arrangements. For example, elements of wearable projector 102 can be implemented in hardware, software, or combinations thereof. As another example, various elements of the wearable projector 102 may be implemented as one or more digital signal processors.

Referring to FIG. 2, the wearable projector 102 includes a processor 202 operably coupled via a bus 214 to a projector 204, a memory 206, a phone 208, a network interface 210, a user interface 212, a detector 216, and an alert module 218. The processor 202 allows for processing data, in particular managing data between the projector 204, the memory 206, the phone 208, the network interface 210, and the user interface 212, for projecting images and acquiring data. The processor 202 also processes data generated by the detector 216, and controls the alert module 218. The processor 202 may also process information about access points, service providers, and service accounts. The processor 202 may be implemented as any processor having sufficient capabilities to implement the techniques described herein, for example such as a general-purpose processor, a special-purpose processor, a system-on-chip (SOC), or the like. The SOC may include signal processing functionality such as echo cancellation/reduction and gain control. In some embodiments, the wearable projector 102 may omit one or more of the depicted elements. For example, when implemented as a media player, wearable projector 102 may not include a microphone or network interface 210.

The projector 204 may include a laser operably coupled to a display engine (for example, software, hardware, and/or firmware) in one example. An applicable laser may be miniature in size and may be coupled to a low-power display engine for creating a high-quality image 108 on a surface 106, at various distances, without the need for focusing. By using laser light, a focal point is not required and the image 108 is of high quality and legibility. Distance from the headset to the target surface, power, and brightness of the laser are parameters for use, with a large distance for a highly lit area requiring more power for the laser in typical cases.

In another embodiment, the projector 204 may also be used to capture images for future recall and/or display, identification, transmission, data input (for example, barcode, written telephone number, business cards, and the like), or other utilization. The projector 204 may include text and/or barcode recognition software or firmware in one example.

In another embodiment of the wearable projector 102, available LCD driving techniques with a projecting light source may be used to project the images 108. In this embodiment, the projector 204 may include a light source (for example, a laser) projected from behind an LCD display, thereby shining through the display when the LCD allows light to pass. When the LCD is driven to show text or an image, the projected light is partially blocked, thereby projecting a negative image of that on the LCD onto display surface 106. In another embodiment of the wearable projector 102, one or more LEDs may be used for illumination.

The memory 206 may include a variety of memories, and in one example includes SDRAM, ROM, flash memory, or a combination thereof. The memory 206 may further include separate memory structures or a single integrated memory structure. In one example, the memory 206 may be used to store passwords, network and telecommunications programs, and/or an operating system (OS). In one embodiment, the memory 206 may store acquired images or data and laser parameters.

The phone 208 may include an acoustic transducer, such as a microphone, a speaker, or a combination thereof, for transmission of sound (such as from the user's mouth or to the user's ear based upon signals from an audio source). The phone 208 may also include a plurality of transducers for performing different functions. The transducers can be any type of electromagnetic, piezoelectric, or electrostatic type of driving element, or a combination thereof, or another form of driving element, for generating sound waves from the output face of the transducer. In one embodiment, the phone 208 may receive signals through wireless communication channels, such as by Bluetooth protocols and hardware, in one example.

The network interface 210 allows for communications with APs, and in one example includes a transceiver for communicating with a wireless local area network (LAN) radio transceiver (for example, wireless fidelity (WiFi), Bluetooth, ultra wideband (UWB) radio, and the like.) for access to a network (for example, a wireless LAN or the Internet), or an adaptor for providing wired communications to a network. In one example, the network interface 210 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. The network interface 210 is adapted to communicate over the network using the network address that it derives for the headset. In one embodiment, the network interface 210 is able to transmit and receive digital and/or analog signals, and in one example communicates over the network using IP, wherein the network interface uses the headset's MAC address or another globally unique address as its IP address. In particular, the network interface 210 may be operably coupled to a network via the IEEE 802.11 protocol. However, the network interface 210 may communicate using any of various protocols known in the art for wireless or wired connectivity.

The user interface 212 allows for manual communication between the headset user and the wearable projector 102, and in one example includes an audio and/or visual interface such that a prompt may be provided to the user's ear and/or an LED may be lit.

The detector 216 detects electromagnetic radiation. In the example of FIG. 2, the detector 216 detects visible light such as might be received as a reflection of the light 104 produced by the wearable projector 102. Any detector 216 of electromagnetic radiation can be used. Current examples include photocells, photodiodes, phototransistors, charge-coupled imaging devices, and the like.

Figure 3:
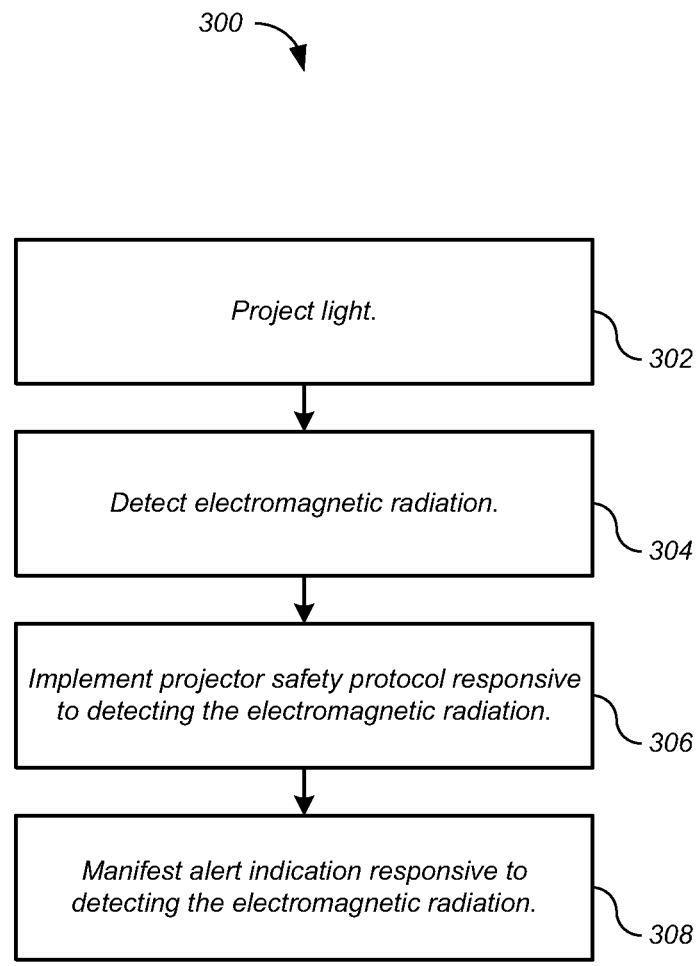
FIG. 3 shows a process for the wearable projector of FIGS. 1 and 2 according to one embodiment.

FIG. 3 shows a process 300 for the wearable projector 102 of FIGS. 1 and 2 according to one embodiment. Although in the described embodiments the elements of the process 300 are presented in one arrangement, other embodiments may feature other arrangements. For example, in various embodiments, some or all of the elements of the process 300 can be executed in a different order, concurrently, and the like. Also some elements of the process 300 may not be performed, and may not be executed immediately after each other. In addition, some or all of the elements of the process 300 can be performed automatically, that is, without human intervention.

Referring to FIG. 3, at 302, the projector 204 projects light 104. At 304, the detector 216 detects electromagnetic radiation. At 306, responsive to the detector 216 detecting the electromagnetic radiation, the projector 204 implements a projector safety protocol. The protocol can include reducing an intensity of the light 104 either partially or totally, changing a direction of projection of the light 104, and the like. At 308, the alert module 218 manifests an alert indication responsive to the detector 216 detecting the electromagnetic radiation. The alert indication may take any form, including visible alerts, audible alerts, haptic alerts, and the like.

Figure 4:
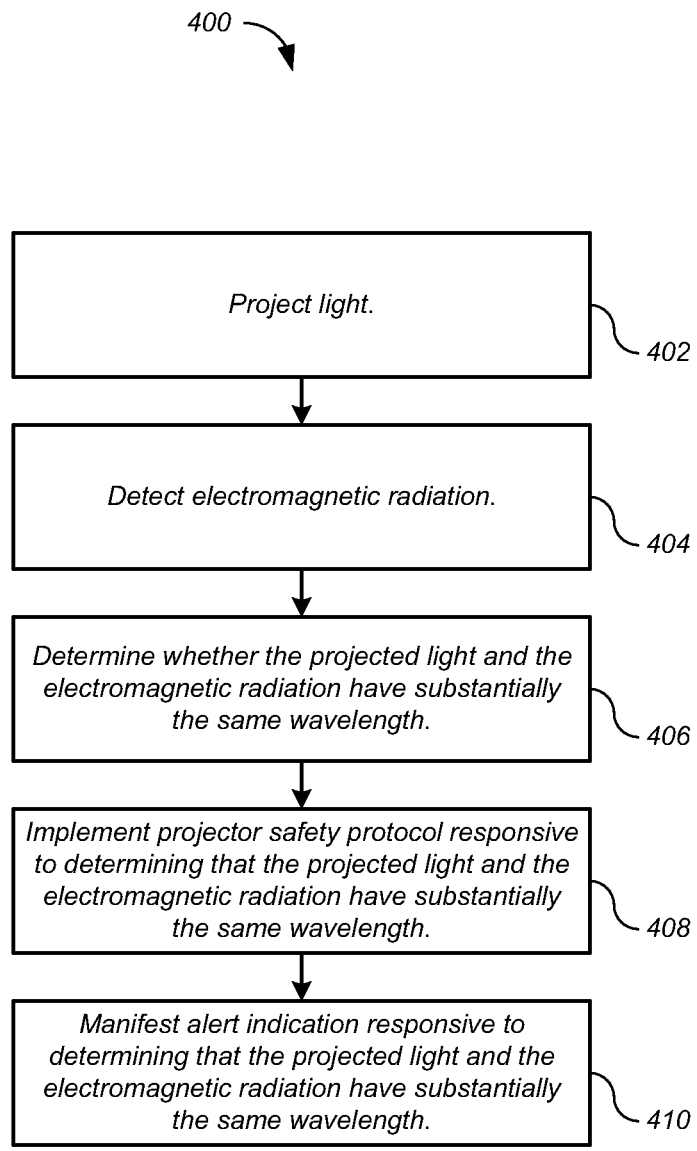
FIG. 4 shows a process for the wearable projector of FIGS. 1 and 2 according to an embodiment that requires the projected light and the detected electromagnetic radiation to have substantially the same wavelength before implementing projector safety protocols.

Some embodiments require the projected light 104 and the detected electromagnetic radiation to have substantially the same wavelength before implementing projector safety protocols. This requirement helps to ensure that the projector safety protocols are implemented only when the detector 216 detects light reflected from the projector 204, rather than light having some other source. Because some reflective surfaces may alter the wavelength of the projected light somewhat, the wavelengths need not be exactly the same, but need only be substantially the same. FIG. 4 shows a process 400 for the wearable projector 102 of FIGS. 1 and 2 according to such an embodiment. Although in the described embodiments the elements of the process 400 are presented in one arrangement, other embodiments may feature other arrangements. For example, in various embodiments, some or all of the elements of the process 400 can be executed in a different order, concurrently, and the like. Also some elements of the process 400 may not be performed, and may not be executed immediately after each other. In addition, some or all of the elements of the process 400 can be performed automatically, that is, without human intervention.

Referring to FIG. 4, at 402, the projector 204 projects light 104. At 404, the detector 216 detects electromagnetic radiation. The detector 216 provides an indication of the wavelength of the detected electromagnetic radiation to the processor 202. At 406, the processor 202 determines whether the projected light 104 and the detected electromagnetic radiation have substantially the same wavelength. At 408, responsive to the processor 202 determining that the projected light 104 and the detected electromagnetic radiation have substantially the same wavelength, the projector 204 implements a safety protocol. The protocol can reducing an intensity of the light 104 either partially or totally, changing a direction of projection of the light 104, and the like. At 410, the alert module 218 manifests an alert indication responsive to the processor 202 determining that the projected light 104 and the electromagnetic radiation have substantially the same wavelength. The alert indication may take any form, including visible alerts, audible alerts, haptic alerts, and the like.

Figure 5:
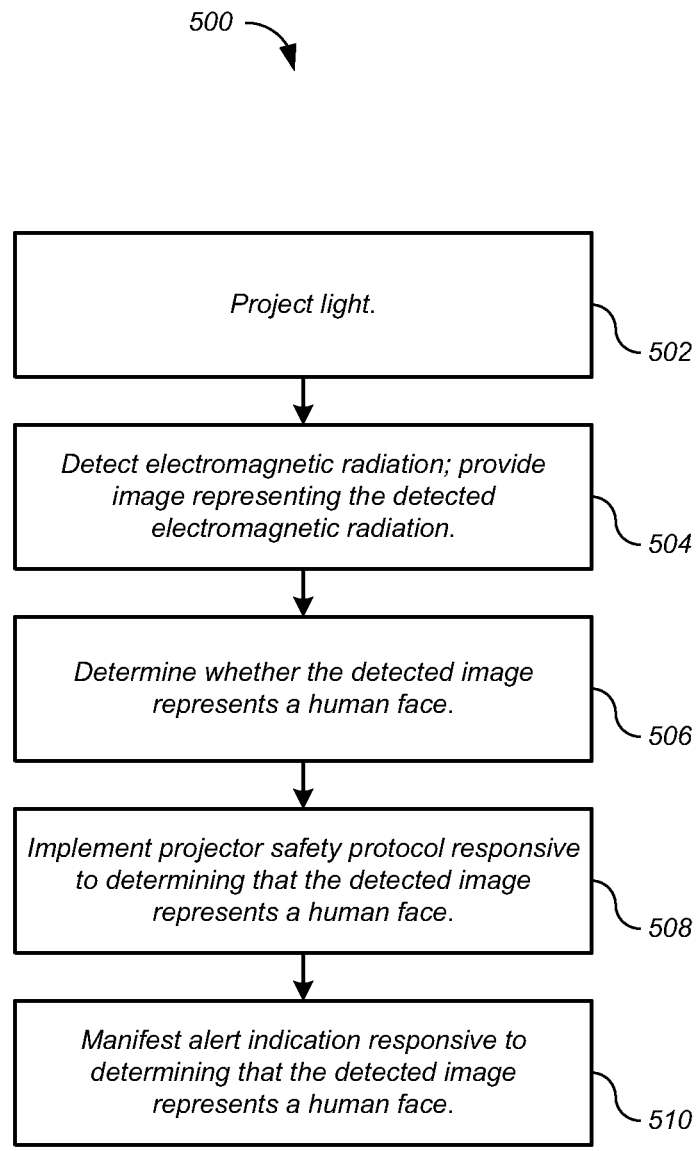
FIG. 5 shows a process for the wearable projector of FIGS. 1 and 2 according to an embodiment that requires the detection of a human face before implementing projector safety protocols.

Some embodiments require the detection of a human face before implementing projector safety protocols. This requirement helps to ensure that the projector safety protocols are implemented only when the projected light is reflected by a human face, rather than by some other object. FIG. 5 shows a process 500 for the wearable projector 102 of FIGS. 1 and 2 according to such an embodiment. Although in the described embodiments the elements of the process 500 are presented in one arrangement, other embodiments may feature other arrangements. For example, in various embodiments, some or all of the elements of the process 500 can be executed in a different order, concurrently, and the like. Also some elements of the process 500 may not be performed, and may not be executed immediately after each other. In addition, some or all of the elements of the process 500 can be performed automatically, that is, without human intervention.

Referring to FIG. 5, at 502, the projector 204 projects light 104. At 504, the detector 216 detects electromagnetic radiation. The detector 216 provides an image representing the detected electromagnetic radiation to the processor 202. For example, in this embodiment, the detector can be a camera, CCD, or the like. At 506, the processor 202 determines whether the detected image represents a human face. In some cases, the projected image 108 may contain an image of a human face. Any technique may be used to ensure the image provided by detector 216 represents a reflection from a human face, rather than a projection of an image 108 of a human face. For example, the projector 204 may briefly change the image 108 to determine whether the detected human face persists. As another example, the processor 202 may compare the projected image 108 to the image provided by the detector 216.

At 508, responsive to the processor 202 determining that the detected image represents a human face, the projector 204 implements a safety protocol. The protocol can include reducing an intensity of the light 104 either partially or totally, changing a direction of projection of the light 104, and the like. At 510, the alert module 218 manifests an alert indication responsive to the processor 202 determining that the detected image represents a human face. The alert indication may take any form, including visible alerts, audible alerts, haptic alerts, and the like.

Figure 6:
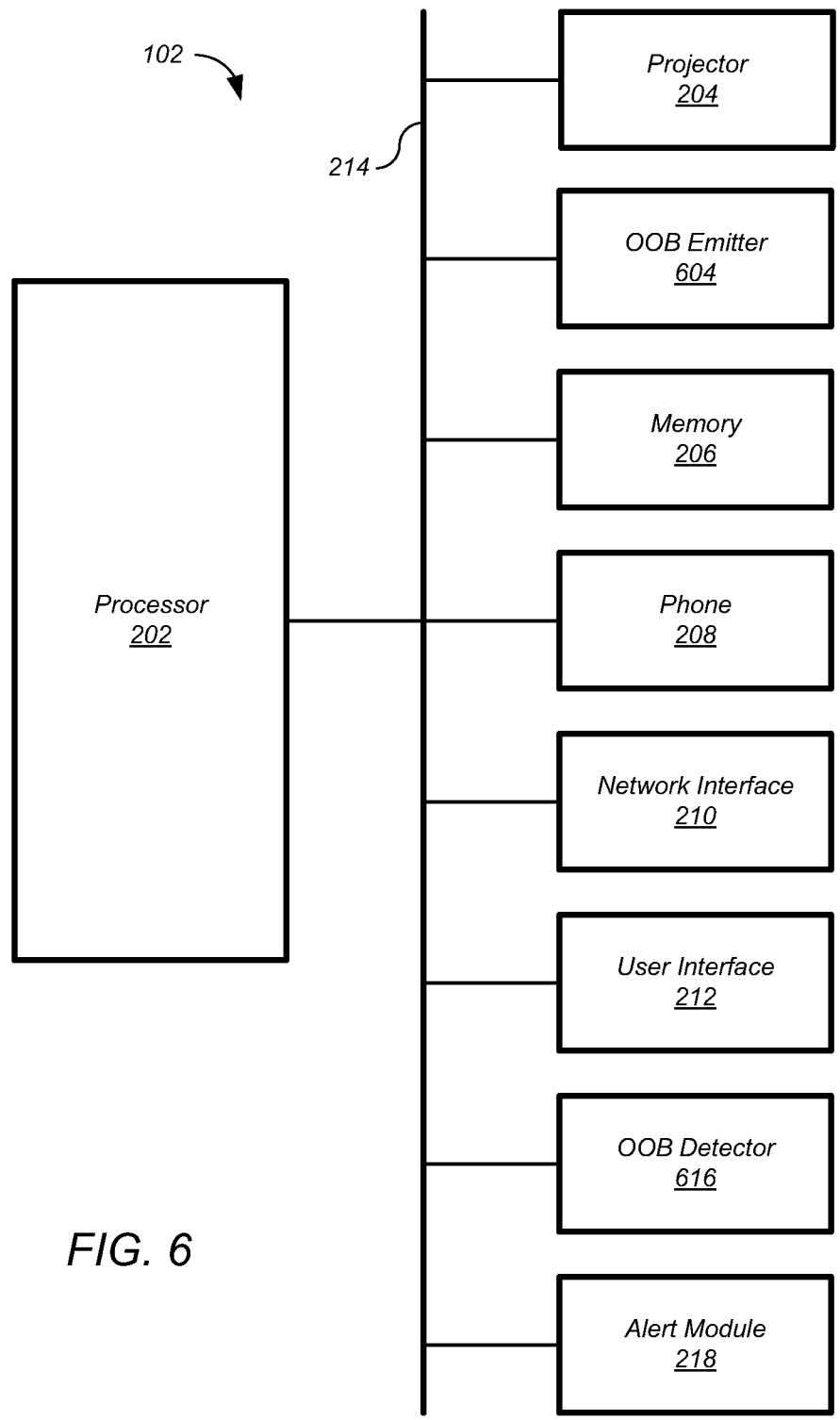
FIG. 6 shows elements of the wearable projector of FIG. 1 according to an embodiment that detects reflections using out-of-band emissions rather than using the projected light.

Some embodiments detect reflections using out-of-band emissions rather than using the projected light 104. FIG. 6 shows elements of the wearable projector 102 of FIG. 1 according to one such embodiment. Although in the described embodiment elements of the wearable projector 102 are presented in one arrangement, other embodiments may feature other arrangements. For example, elements of wearable projector 102 can be implemented in hardware, software, or combinations thereof. As another example, various elements of the wearable projector 102 may be implemented as one or more digital signal processors.

Referring to FIG. 6, the wearable projector 102 includes a processor 202 operably coupled via a bus 214 to a projector 204, a memory 206, a phone 208, a network interface 210, a user interface 212, an out-of-band (OOB) detector 616, an OOB emitter 604, and an alert module 218. The processor 202 allows for processing data, in particular managing data between the projector 204, the OOB detector 616, the OOB emitter 604, the memory 206, the phone 208, the network interface 210, and the user interface 212, for projecting images and acquiring data. The processor 202 also processes data generated by the detector 216, and controls the alert module 218. The processor 202 may also process information about access points, service providers, and service accounts. The processor 202 may be implemented as any processor having sufficient capabilities to implement the techniques described herein, for example such as a general-purpose processor, a special-purpose processor, a system-on-chip (SOC), or the like. The SOC may include signal processing functionality such as echo cancellation/reduction and gain control. In some embodiments, the wearable projector 102 may omit one or more of the depicted elements. For example, when implemented as a media player, wearable projector 102 may not include a microphone or network interface 210. The processor 202, the bus 214, the projector 204, the memory 206, the phone 208, the network interface 210, the user interface 212, and the alert module 218 operate in a similar manner as described with respect to in FIG. 2.

The OOB emitter 604 emits OOB electromagnetic radiation, that is, electromagnetic radiation having a wavelength that is not substantially the same as that of the light 104 projected by the projector 204. For example, the OOB electromagnetic radiation may be outside the visible light spectrum, thereby reducing the risk of eye damage. In one embodiment, the OOB electromagnetic radiation has a wavelength of 890 nm. The OOB detector 616 is configured to detect the OOB electromagnetic radiation emitted by the OOB emitter 604.

Figure 7:
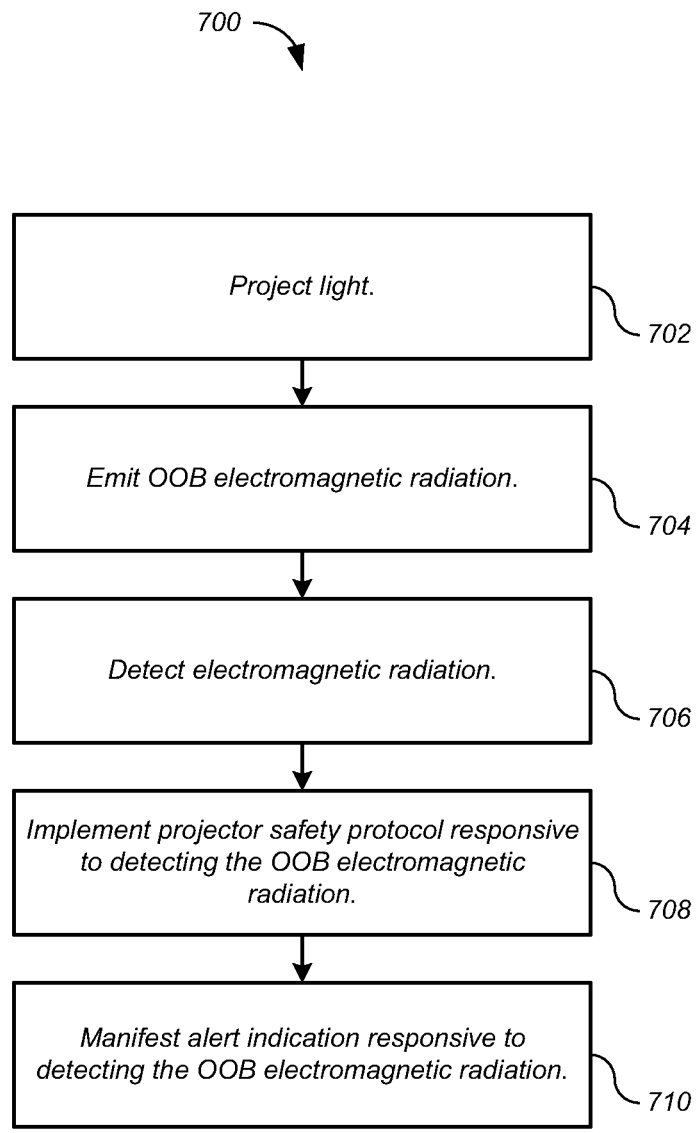
FIG. 7 shows a process for the wearable projector of FIGS. 1 and 6 according to one embodiment.

FIG. 7 shows a process 700 for the wearable projector 102 of FIGS. 1 and 6 according to one embodiment. Although in the described embodiments the elements of the process 700 are presented in one arrangement, other embodiments may feature other arrangements. For example, in various embodiments, some or all of the elements of the process 700 can be executed in a different order, concurrently, and the like. Also some elements of the process 700 may not be performed, and may not be executed immediately after each other. In addition, some or all of the elements of the process 700 can be performed automatically, that is, without human intervention.

Referring to FIG. 7, at 702, the projector 204 projects light 104. At 704, the OOB emitter 604 emits OOB electromagnetic radiation. The fields of projection of the projector 204 and the OOB emitter 604 may overlap substantially or completely. At 706, the OOB detector 216 detects OOB electromagnetic radiation.

At 708, responsive to the OOB detector 216 detecting the OOB electromagnetic radiation, the projector 204 implements a safety protocol. The protocol can include ceasing to project the light 104, reducing an intensity of the light 104, changing a direction of projection of the light 104, and the like. At 710, the alert module 218 manifests an alert indication responsive to the OOB detector 216 detecting the OOB electromagnetic radiation. The alert indication may take any form, including visible alerts, audible alerts, haptic alerts, and the like.

In some embodiments, the process 700 includes additional requirements in order to implement the projector safety protocols. For example, the projector safety protocols may be implemented only responsive to the projected OOB electromagnetic radiation and the detected OOB electromagnetic radiation having substantially the same wavelength, for example as described above. As another example, the projector safety protocols may be implemented only responsive to determining that the detected image represents a reflection of the OOB electromagnetic radiation by a human face, for example as described above.

Figure 8:
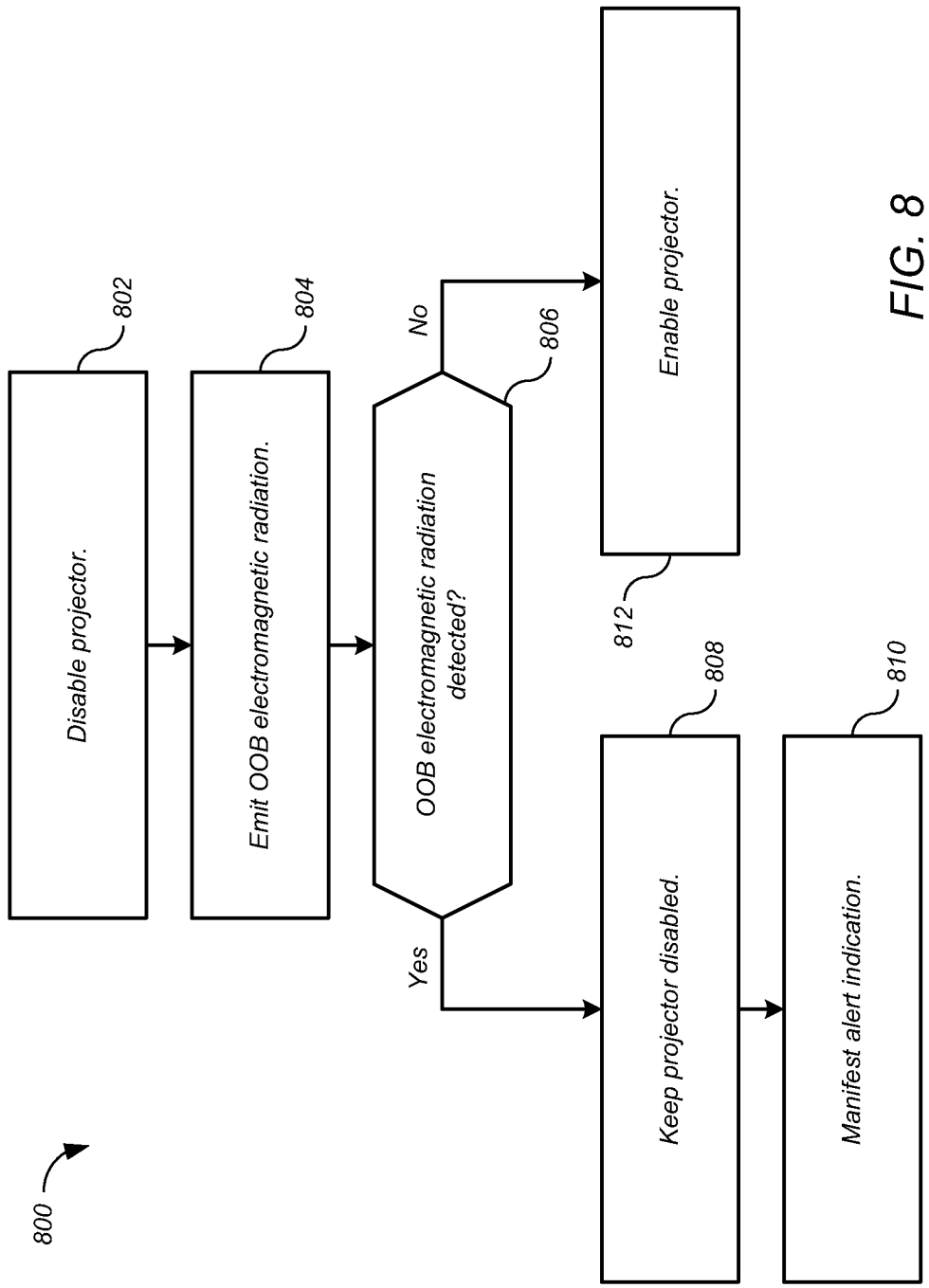
FIG. 8 shows a process for the wearable projector of FIGS. 1 and 6 according to an embodiment that uses OOB emissions to scan for reflections, faces, and the like before the projector is allowed to project light.

In some embodiments the OOB emitter 604 and OOB detector 616 are used to scan for reflections, faces, and the like before the projector 204 is allowed to project light 104. FIG. 8 shows a process 800 for the wearable projector 102 of FIGS. 1 and 6 according to one such embodiment. Although in the described embodiments the elements of the process 800 are presented in one arrangement, other embodiments may feature other arrangements. For example, in various embodiments, some or all of the elements of the process 800 can be executed in a different order, concurrently, and the like. Also some elements of the process 800 may not be performed, and may not be executed immediately after each other. In addition, some or all of the elements of the process 800 can be performed automatically, that is, without human intervention.

Referring to FIG. 8, at 802, the projector 204 is disabled, that is, the projector 204 is prevented from projecting any significant amount of light 104. At 804, the OOB emitter 604 emits OOB electromagnetic radiation. The fields of projection of the projector 204 and the OOB emitter 604 may overlap substantially or completely. At 806, the processor 202 determines whether the OOB detector 216 has detected any OOB electromagnetic radiation.

At 808, responsive to the OOB detector 216 detecting OOB electromagnetic radiation, the projector 204 is kept disabled. In addition, At 810, the alert module 218 manifests an alert indication responsive to the OOB detector 216 detecting the OOB electromagnetic radiation. The alert indication may take any form, including visible alerts, audible alerts, haptic alerts, and the like. But if, at 806, the OOB detector 216 detects any OOB electromagnetic radiation, then, at 812, the projector 204 is enabled; that is, the projector 204 is allowed to project light 104.

In some embodiments, the process 800 includes additional requirements in order to keep the projector 204 disabled. For example, the projector 204 may be kept disabled only responsive to the projected OOB electromagnetic radiation and the detected OOB electromagnetic radiation having substantially the same wavelength, for example as described above. As another example, the projector 204 may be kept disabled only responsive to determining that detected OOB electromagnetic radiation represents a reflection of the OOB electromagnetic radiation by a human face, for example as described above.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A projector comprising:
a detector configured to detect first out-of-band (OOB) electromagnetic radiation;
a processor configured to implement a protocol responsive to the detector detecting the first OOB electromagnetic radiation, wherein the protocol comprises reducing an intensity of light projected by the projector; and
an emitter configured to emit second OOB electromagnetic radiation, wherein the first OOB electromagnetic radiation comprises a reflection of the second OOB electromagnetic radiation;
wherein the processor implements the protocol only responsive to the first OOB electromagnetic radiation and the second OOB electromagnetic radiation having substantially the same wavelength.

2. The projector of claim 1, further comprising:
an alert module configured to manifest an alert indication responsive to the detector detecting the first OOB electromagnetic radiation.

3. The projector of claim 1, wherein:
the processor is further configured to determine whether the first OOB electromagnetic radiation represents a reflection of the second OOB electromagnetic radiation by a human face; and
the projector implements the protocol only responsive to the processor determining that the first OOB electromagnetic radiation represents a reflection of the second OOB electromagnetic radiation by a human face.

4. The projector of claim 1, further comprising:
an attachment device configured to secure the projector to a user's head such that a field of view of the user coincides with a field of projection of the projector.

5. The projector of claim 4, further comprising:
a phone.

6. The projector of claim 5, wherein:
the phone is configured to receive a call; and
the processor is further configured to cause the projector to project an image that represents metadata for the call responsive to the phone receiving the call.

7. A method comprising: projecting light;
detecting first out-of-band (OOB) electromagnetic radiation;
implementing a protocol responsive to detecting the first OOB electromagnetic radiation, wherein the protocol comprises reducing an intensity of the light; and
emitting second OOB electromagnetic radiation, wherein the first OOB electromagnetic radiation comprises a reflection of the second OOB electromagnetic radiation; and
implementing the protocol only responsive to the first OOB electromagnetic radiation and the second OOB electromagnetic radiation having substantially the same wavelength.

8. The method of claim 7, further comprising:
manifesting an alert indication responsive to detecting the first OOB electromagnetic radiation.

9. The method of claim 7, further comprising:
determining whether the first OOB electromagnetic radiation represents a reflection of the second OOB electromagnetic radiation by a human face; and
implementing the protocol only responsive to determining that the first OOB electromagnetic radiation represents a reflection of the second OOB electromagnetic radiation by a human face.

10. The method of claim 7, further comprising:
securing the projector to a user's head such that a field of view of the user coincides with a field of projection of the projector.

11. The method of claim 10, further comprising:
receiving a call;
wherein the light creates an image that represents metadata for the call.

12. The method of claim 11, further comprising:
projecting the light responsive to receiving the call.

13. Computer-readable non-transitory media embodying instructions executable by a computer to perform functions comprising:
causing a projector to project light;
implementing a protocol responsive to detecting first out-of-band (OOB) electromagnetic radiation, wherein the protocol comprises reducing an intensity of the light;
causing the projector to emit second OOB electromagnetic radiation, wherein the first OOB electromagnetic radiation comprises a reflection of the second OOB electromagnetic radiation; and
implementing the protocol only responsive to the first OOB electromagnetic radiation and the second OOB electromagnetic radiation having substantially the same wavelength.

14. The computer-readable non-transitory media of claim 13, wherein the functions further comprise:
causing manifestation of an alert indication responsive to detecting the first OOB electromagnetic radiation.

15. The computer-readable non-transitory media of claim 13, wherein the functions further comprise:
determining whether the first OOB electromagnetic radiation represents a reflection of the second OOB electromagnetic radiation by a human face; and
implementing the protocol only responsive to determining the first OOB electromagnetic radiation represents a reflection of the second OOB electromagnetic radiation by a human face.

* * * * *